United States Patent

Miner

[15] 3,672,452

[45] June 27, 1972

[54] APPARATUS FOR HARVESTING SOD

[72] Inventor: William W. Miner, P.O. Box 392, Cranbury, N.J. 08512

[22] Filed: Dec. 30, 1969

[21] Appl. No.: 889,034

Related U.S. Application Data

[62] Division of Ser. No. 618,765, Feb. 27, 1967, Pat. No. 3,519,082.

[52] U.S. Cl. .................................................. 172/19, 172/45
[51] Int. Cl. ...................................................... A01b 45/04
[58] Field of Search ..................... 172/19, 20; 171/21; 270/85

[56] References Cited

UNITED STATES PATENTS

| 41,371 | 1/1864 | Foley | 172/20 |
|---|---|---|---|
| 2,703,953 | 3/1955 | Altemus | 171/27 X |
| 2,998,081 | 8/1961 | Hartmangruber et al. | 172/20 |
| 3,051,251 | 8/1962 | Golden | 172/20 |
| 3,339,914 | 9/1967 | Grantham | 270/85 X |
| 3,357,499 | 12/1967 | Finneyfrock | 172/19 |
| 3,410,350 | 11/1968 | Ware | 172/20 X |
| 3,509,944 | 5/1970 | Brouwer et al. | 172/20 X |

FOREIGN PATENTS OR APPLICATIONS

| 280,621 | 7/1966 | Netherlands | 172/19 |

Primary Examiner—Robert E. Pulfrey
Assistant Examiner—Stephen C. Pellegrino
Attorney—Scofield, Kokjer, Scofield & Lowe

[57] ABSTRACT

An ambulatory apparatus cuts sod from a sod field in a continuous strip and includes a reciprocating cutting head assembly mounted substantially at the forward end of the apparatus. A conveying means conveys the strip cut by the cutting head assembly interiorly of and to the rear of the apparatus and into contact with a flail which strikes off excess attached soil from the underside of the soil strip. A severing apparatus cuts the sod strip into sod pads of a preselected size and a folding device folds the severed sod pads prior to same being placed on a pallet supporting area located at the rear of the apparatus.

16 Claims, 9 Drawing Figures

INVENTOR
William W. Miner

BY

ATTORNEYS

APPARATUS FOR HARVESTING SOD

This is a division of my application entitled "METHOD AND APPARATUS FOR HARVESTING SOD," Ser. No. 618,765, now U.S. Pat. No. 3,519,082, filed Feb. 27, 1967.

BACKGROUND AND BRIEF DESCRIPTION OF THE INVENTION

The invention disclosed herein relates to the previously nonelected claims after a restriction requirement by the Patent Office.

As in many agriculturally oriented industries, the increased demand for a product can only be satisfied through advanced mechanization. The cultivated turf grass industry is rapidly growing due to the expanding population, the increase in leisure time, and the acute awareness of the need for the preservation and increase of the aesthetic appearance available only by the use of a healthy luxurious green turf. It is therefore one of the primary features of the invention to reduce the time and labor involved in harvesting cultivated turfgrasses.

The instant invention is directed to increasing the immediate usability of the harvested product as well as decreasing the time and labor costs which generally accompany the harvesting of cultivated turfgrasses. The instant invention, in the form of an ambulatory harvesting apparatus, is equipped with large flotation tires which support the harvester in the sod fields and eliminate ruts and damage to the grasses so as to permit sod harvesting even in extremely wet weather. The driver or operator of the apparatus has an unobstructed view of the area to be harvested and need only align depending chain guides relative to the previously harvested swath and drive the apparatus in either straight line "trips," down and back, or circular fashion depending which harvesting method is the most economical and efficient.

As the apparatus is moved through the sod field, the cutter head assembly, which is mounted on the forward portion of the machine, operates with a reciprocating motion to cut the sod into a continuous strip. A spring biased gauge wheel (cylindrical in shape) moves forwardly of the actual cutting mechanism and cooperates with same to cut the sod into strips of a substantially uniform thickness. As the sod strip is cut it is moved interiorly of the apparatus into contact with a tine conveyor and packing spring. The tine conveyor further moves the strip into contact with a rotating, high speed flail which contacts the underside of the sod strip and removes excess soil and/or stones which are sometimes present even when the cutting depth has been regulated by the gauge wheel mentioned above. Accordingly, the combination gauge wheel and flail produce a sod pad of uniform thickness regardless of what variations may have been produced at the cutter head assembly through the land contours.

After the above-mentioned flailing operation has been completed, the sod strip is conveyed upwardly by cooperating steel mesh conveyor belts, finally delivering the sod strip at a horizontal conveying means. This last named conveying means is comprised of a series of notched disks which rotate on chain driven shafts. The rotary speed of the shafts are so related that there are progressive speed increases as the sod strip moves from the forward portion of the rotary disk conveying means to the aft portion of the apparatus. All the disks have an upper surface lying in the same horizontal plane so that the progressive increase in speed allows the rotary disks to essentially "grab" the leading edge of the rearwardly heading sod strip and appropriately straighten out the direction of travel of the strip.

As the sod strip is moved rearwardly on the disk conveyors, an automatic cut-off knife and associated rolling mandrel are positioned to cut the sod strip into sod pads any desired length. The severed sod pads are continuously moved to the rear portion of the machine until they contact a folding mechanism which is so timed relative to the severing of the strip that an associated hydraulic piston is sharply retracted to flip the folding upwardly, thusly folding the rear half of the sod pad over on its forward half in a grass-to-grass relationship. The folded pad continues to the rear of the apparatus where it is picked off an inclined chute and placed on pallets also carried by the machine. It is contemplated that a chain and hook conveyor in combination with a pneumatic discharge plunger may be used to automatically stack the severed sod pads, however the present invention utilizes manual labor in placing the folded pads on the above-mentioned pallets.

The pallet itself is supported on an elevator type roller bed which may be hydraulically lowered as each layer of sod is stacked thereon. In this manner, the working height of the sod stack is always in optimum position for the personnel or automatic stacking means which delivers the sod pads to the pallets. When a desired number of sod pads have been placed on the pallet, such as may be shown by the harvester's automatic counter, a trip lever tilts the roller bed and allows the stacked pallet to slide easily out of the rear of the machine onto the field in an area that has been previously harvested. An empty pallet, which is carried by the machine, is then swung into place and the sod harvesting operation proceeds without interruption. To complete the mechanized handling of the sod, a conventional forklift may engage the sod laden pallet and place same on the back end of a truck for the eventual delivery of the harvested product at the site utilizing same.

A principal object of the invention is therefore to reduce the time and costs in harvesting turfgrasses and in delivering an immediately utilizable product to the sod laying area.

Another object of the invention is to provide an apparatus that automatically harvests and prepares sod pads for easy loading and immediate use. It is a particularly important feature of the invention that the subject apparatus cuts the sod into strips of uniform thickness and that any cutting head undulation thicknesses or unwanted stones are flailed from the underside of the pad as it is processes through the harvesting apparatus.

Another object of the invention is to provide an uniquely mounted cutter head assembly for an ambulator sod harvester. The mounting of said cutter head assembly allows same to "float" over the sod field being harvested and to cut the sod into strips in a plane substantially parallel to the surface of the sod field.

A still further object of the invention is to provide a sod harvesting apparatus of the character described that has an uniquely constructed pallet support and lift structure. This structure includes a means for elevating the sod pad holding pallets at optimum positions during the entire harvesting operation.

A further object of the invention is to provide a sod harvesting apparatus of the character described which includes an unique folding mechanism which folds a severed sod pad in half after same has been cut and sized.

Another object of the invention is to provide, in an sod harvester of the character described, an unique sod strip severing means. This severing means includes a cooperating rotary knife and rolling mandrel and results in a convenient means for cutting the sod strip into uniform pads of equal preselected lengths.

A further object of the invention is to provide an unique supporting and backup structure for the flailing operations. This unique structure keeps the number of component parts at a minimum and substantially decreases the size and area required for this operation.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals indicate like parts in the various views;

FIG. 9 is a top plan view of the flail.

Figure 1:
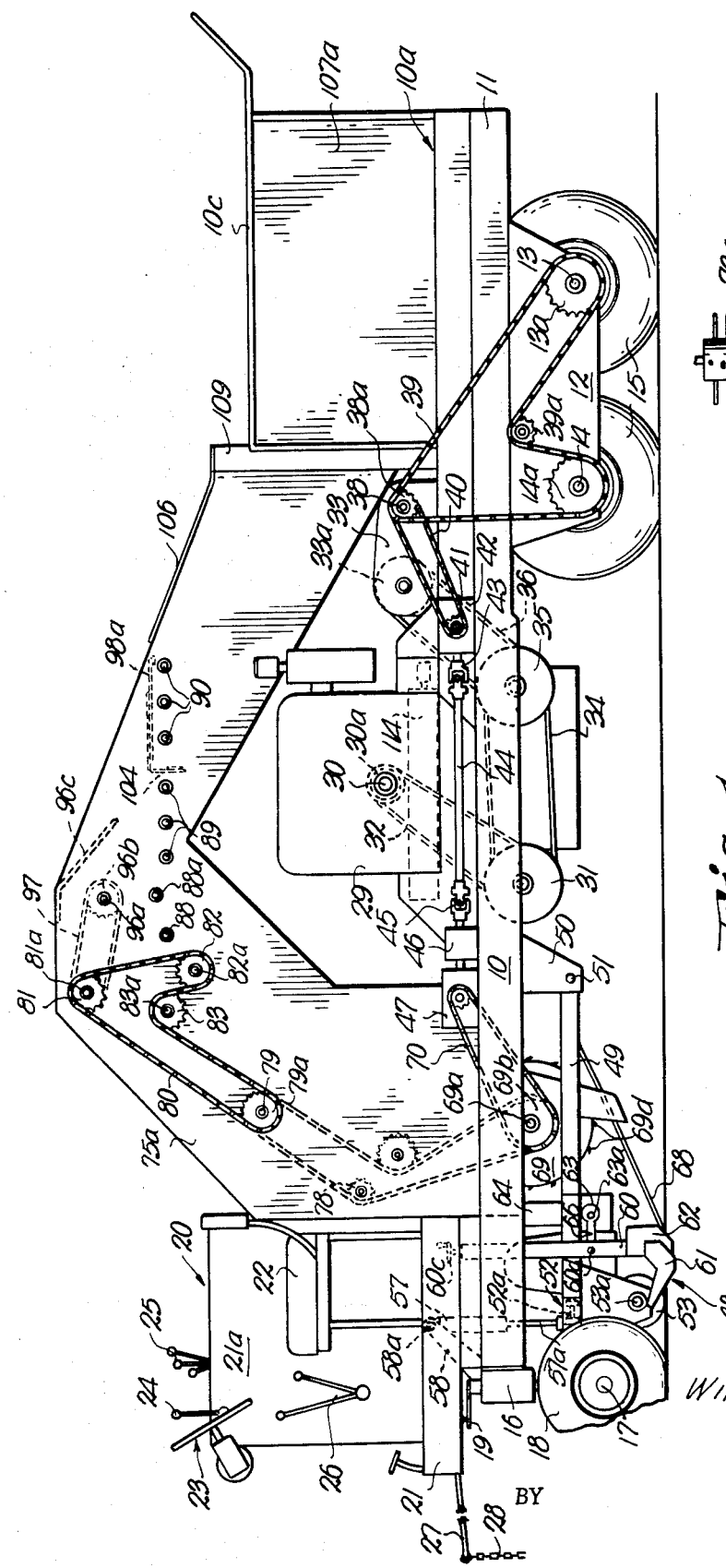
FIG. 1 is a side elevational view of the sod harvester with important drive linkages and mechanisms ordinarily hidden shown in broken lines.

Turning now more particularly to the drawings, reference numeral 10 indicates the main portion of the frame of the subject apparatus. Frame 10 is increased in width substantially the rear half thereof. Supporting structurals 11 are welded thereto and extend substantially in the same horizontal plane. This rear frame upper surface provides two working deck platforms 10a and 10b (FIG. 2) on either side of main frame 10 as will be discussed infra.

Opposed steel plates 12 are welded to and depend from frame 10 to provide the necessary bearing surfaces for rear axles 13 and 14. Large flotation tires 15 are rotatably affixed to axles 13 and 14 near each end portion thereof and support the rear of the apparatus without damage to soil or sod.

A transverse beam 16 is integrally connected to and extends across the front end portion of frame 10. A steering rod 16a is journaled at each end portion of beam 16, same extending past the width dimension of frame 10. Each front axle 17 is sleeve mounted (not shown) on the lower end of its corresponding rod 16a. Dual flotation tires 18 are rotatably mounted on each outer end portion of each axle 17 thusly completely supporting (with rear tires 15) the apparatus on ground protecting type tires. Steering arms 19 are interconnected with a corresponding rod 16a so as to impart a pivotal steering movement to the rods and axles 17 when hydraulically moved.

The operator's cab, generally indicated by the numeral 20, is affixed to the forward portion of frame 10 and is generally fixedly supported from frame 10 at its own lower base frame 21. A metal enclosed rectangular structure member 21a is affixed to the left end portion of frame 21 (see FIG. 4) and vertically extends therefrom to enclose one side of the cab area. The cab area includes an operator's seat 22 which is optimally located for functional control of the combination steering wheel and hydraulic valve 23, the gear shift 24, the combination throttle and cutter lift control 25, and conveyor clutch control lever 26.

A rod structure 27, bent in the shape of a rectangle, extends forwardly of lower base frame 21 and has chains 28 connected thereto and hanging down in contact with the ground. The operator has a clear view of the lower end of chain 28 as he occupies seat 22. The positioning of chains 28 relative to the ground aids in the harvesting of the sod as will be discussed later.

Motive power is supplied to the sod harvester from gasoline engine 29 which is rigidly mounted to the central portion of frame 10 in a conventional manner. Fuel tank 29a holds a sufficient quantity to allow continuous operation over lengthy periods of time. The engine drive shaft 30 is coupled through a variable speed drive to transmission 33. It is contemplated that this variable speed drive could be replaced by a hydrostatic drive of various designs, however the drive linkages including drum 30a, drum 31, driving belt 32, drum 35, interconnecting belt 34, and transmission driving belt 36 comprise a satisfactory and operative variable speed drive.

Transmission 33, including a differential with a clutch (not shown) drives the various conveyors as well as rear axles 13 and 14. Shaft 38 extends transversely to the longitudinal center line of frame 10. Sprockets 38a are located on each end portion of shaft 38 and lie in nearly the same vertical plane as sprockets 13a and 14a. Shaft guards 38c circumscribe the upper portions of shafts 38 and are weldedly connected to decks 10a and 10b forwardly over the shafts. Chains 39 drivingly interconnect sprockets 13a, 14a and 38a thereby providing the required driving power to each pair of rear axles 13 and 14. Idler sprocket 39a, supported from plates 12 facilitates the proper rotative direction of sprockets 13a and axles 13.

Sprocket 38b (not shown as it is mounted on shaft 38 behind sprocket 38a, as seen in FIG. 1) drives chain 40 which is in turn drivingly interconnected with the shaft mounted sprocket 41 of gear box 42. The rotary motion from the transmission for powering the various conveyors is then further transmitted forwardly of the apparatus by universal joint 43, shaft 44, forward universal joint 45, jaw clutch 46, forward gear box 47 and finally to the now to be discussed conveyors and associated drive linkages.

Figure 2:
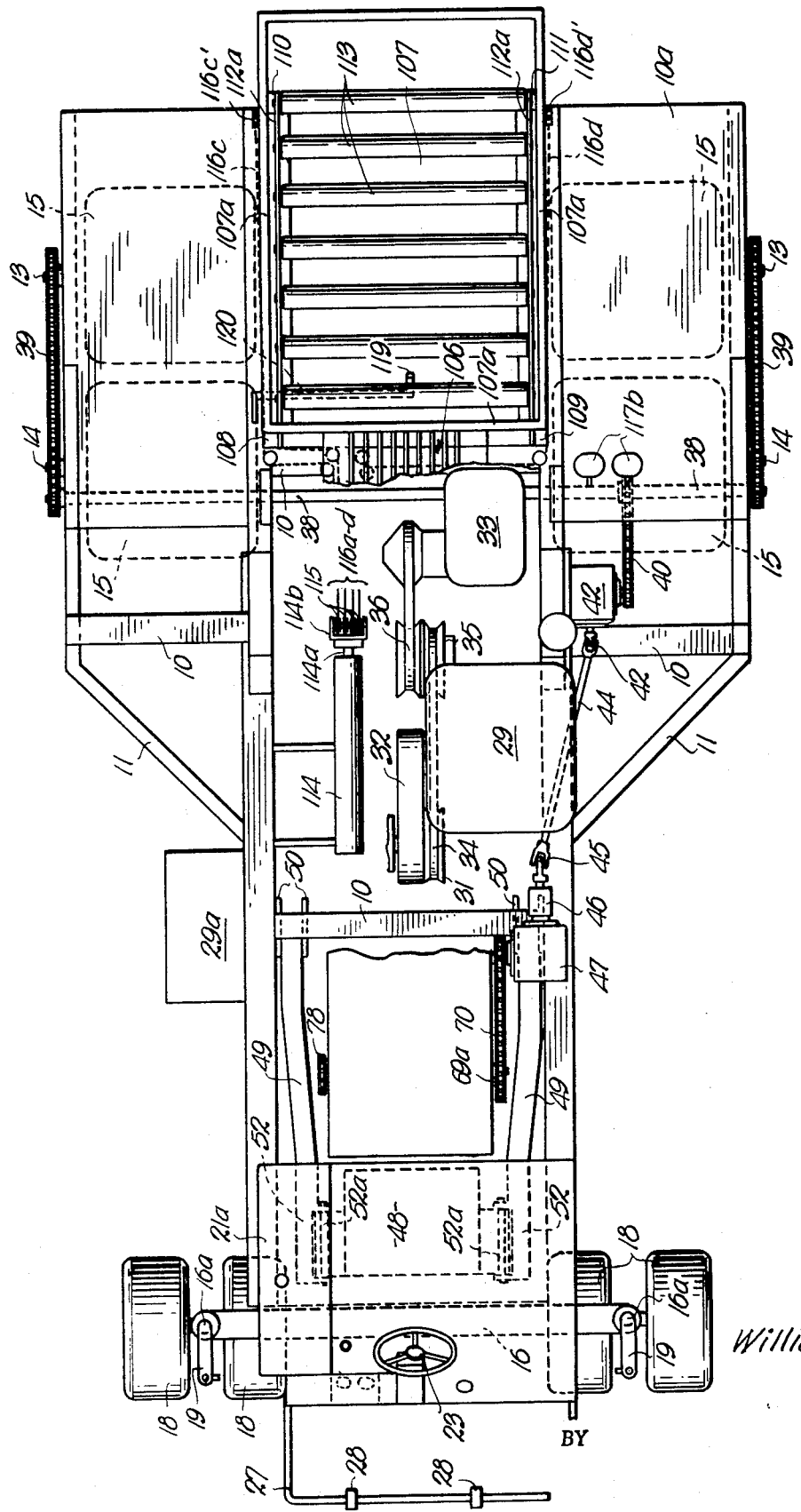
FIG. 2 is a top plan view of the subject harvester with a portion of the conveyors and conveyor enclosure broken away to better show the principal drive linkages used therein.

Turning now to the general construction of the gauging, cutting and conveying mechanisms, the rear portion of the cutting head assembly (this term includes a gauge wheel, the cutting blades, the means to reciprocate the knives and a biasing and lifting means for the gauge assembly), generally indicated by the numeral 48, is pivotally mounted relative to frame 10 on structurals 49. Brackets 50 depend from each side of frame 10 at an equal distance from the forward end thereof. The square sectioned steel tubular structurals 49 are affixed to brackets 50 via the pivotal pin connection 51. Structurals 49 taper inwardly to a more narrow parallel condition at their forward end portion as seen in FIG. 2. Each forward end portion of the structural members 49 is equipped with bracket 52, both of said brackets inwardly positioned on structurals 49. The cutting head assembly 48 is pin mounted via pin 52a to bracket 52.

Cutting head assembly 48 includes a rectangularly shaped frame 48a and horizontally extending arms 48b which are designed to fit within brackets 52 and be pin connected thereto by the above-mentioned pins 52a. Accordingly, the cutter head assembly is essentially pivotally connected relative to frame 10 thereby allowing the assembly to adjust to ground irregularities and contours.

An integral portion of the cutter head assembly is gauge wheel 53. This wheel is cylindrical in shape and solidly constructed with shaft 53a axially extending therethrough and protruding from each end of the cylinder to facilitate further mounting construction. Each shaft (53a) end portion is supported from brackets 54 which are weldedly connected with the side of frame 48a. These brackets have bearing mounts facing inwardly which connect with shaft 53a to facilitate shaft rotation therein. A pair of aligned slotted flanges 55 are welded to brackets 54 in a plane above the upper surface of gauge wheel 53 and extend forwardly of same. A leaf type spring 56 is positioned between flanges 55 by inserting each end portion thereof through the above-mentioned slots. Spring 56 is bowed upwardly at its midpoint where a pin connection is made with piston 57a of hydraulic cylinder 57. It will be seen that when piston 57a is extended a preselected distance, the spring is forced downwardly on flanges 55 biasing gauge wheel 53 into resilient contact with the ground surface.

Hydraulic cylinder 57 is supported at its upper end portion by bracket 58 which extends rearwardly from the center portion of transverse beam 16. Pin 58a extends through the bracket and pivotally interconnects the upper end portion of cylinder 57. Piston 57a extends downwardly therefrom in substantially a vertical plane and passes through a lifting stop 59. As mentioned above, the lower end of piston 57a is pin connected to spring 56 so that the extending of piston 57a hydraulically results in spring 56 being flexed downwardly within flanges 55. Thusly lifting stop 59 does not preclude the downward movement of hydraulic piston 57a which results in the downward pressure on the forward portion of the cutter head assembly. When piston 57a is retracted, the thickened portion of the piston 58b (e.g., the lower end portion) contacts the underside of the lifting stop member 59 so that the cutting head assembly may be raised by the sturdy lift stop rather than by spring 56.

The rearward portion of cutter head assembly 48 is mainly comprised of the cutting knives and the means for mounting and reciprocating same. A pair of pivot arms 60 are interconnected with cutter frame 48a (e.g., one pivot arm is on each side of the frame) in such a manner so as to allow a depth and pitch change of said arms relative to the cutter frame as well as allowing for a reciprocating motion of same. For instance, pin 60a (see FIG. 5) schematically represents a connection of frame 48a and subframe 60e. Arms 60 are pivotally connected to subframe 60e by pins 60f. Screw knob 60b is operative to move subframe 60e (and arms 60) fore or aft relative to frame 48a within arcuate slot 48 on its threaded shaft thereby altering the pitch of the pivot arms. In a similar manner, screw knob 60c may be utilized to draw up or lower the vertical position of subframe 60e and arms 60 along with the now to be described cutting elements. Once the knobs have been set to optimally locate the cutting element a conventional hasp may be set relative to each knob to preclude inadvertent movement.

A specially contoured cutting knife 61, having a sharpened lower forward edge, is bolted to the lower end portions of each pivot arm 60. These knives are operable to make the vertical cuts in the sod as the harvesting apparatus moves over the ground. Interconnected between and movable with the two knives 61 is the horizontally oriented knife 61a (see FIG. 5). Knife 61a is so oriented that a cut below but parallel to the surface of the ground (and between the vertical cuts) is made during operation. A spur guard 62 is bolted to pivot arms 60 immediately to the rear of the mutually cooperating cutting knives 61, 61a and form a portion of the time conveyor to be described infra.

Weldedly or otherwise fixedly connected to the rear of cutter frame 48a is gear box 63. Hydraulic motor 64 drives gear box 63 through a flexible coupling 65. An eccentrically mounted shaft 63a extends from each side of gear box 63. A forwardly extending arm 66 interconnects the end portion of each shaft 63a with each pivot arm 60 at a bearing connection (60d) thereon. The resultant effect of the rotation of eccentric shafts 63a is to reciprocate pivot arms 60 (and also the interconnected knives 61 and 61a) thereby providing a suitable sod cutting motion when hydraulic motor 64 is activated.

It should be understood that the pivotal mountings and connecting means that affix cutter head assembly 48 to frame 10 allow the cutter head assembly to essentially "float" over and closely follow the contour of the ground surface. Pivot pins 51 permit up and down movement of cutter head assembly 48 while pins 52a facilitate the transverse canting of the assembly when ground surface irregularities are encountered. Thus, knife 61a will constantly cut in a plane substantially parallel to the sod surface.

Figure 5:
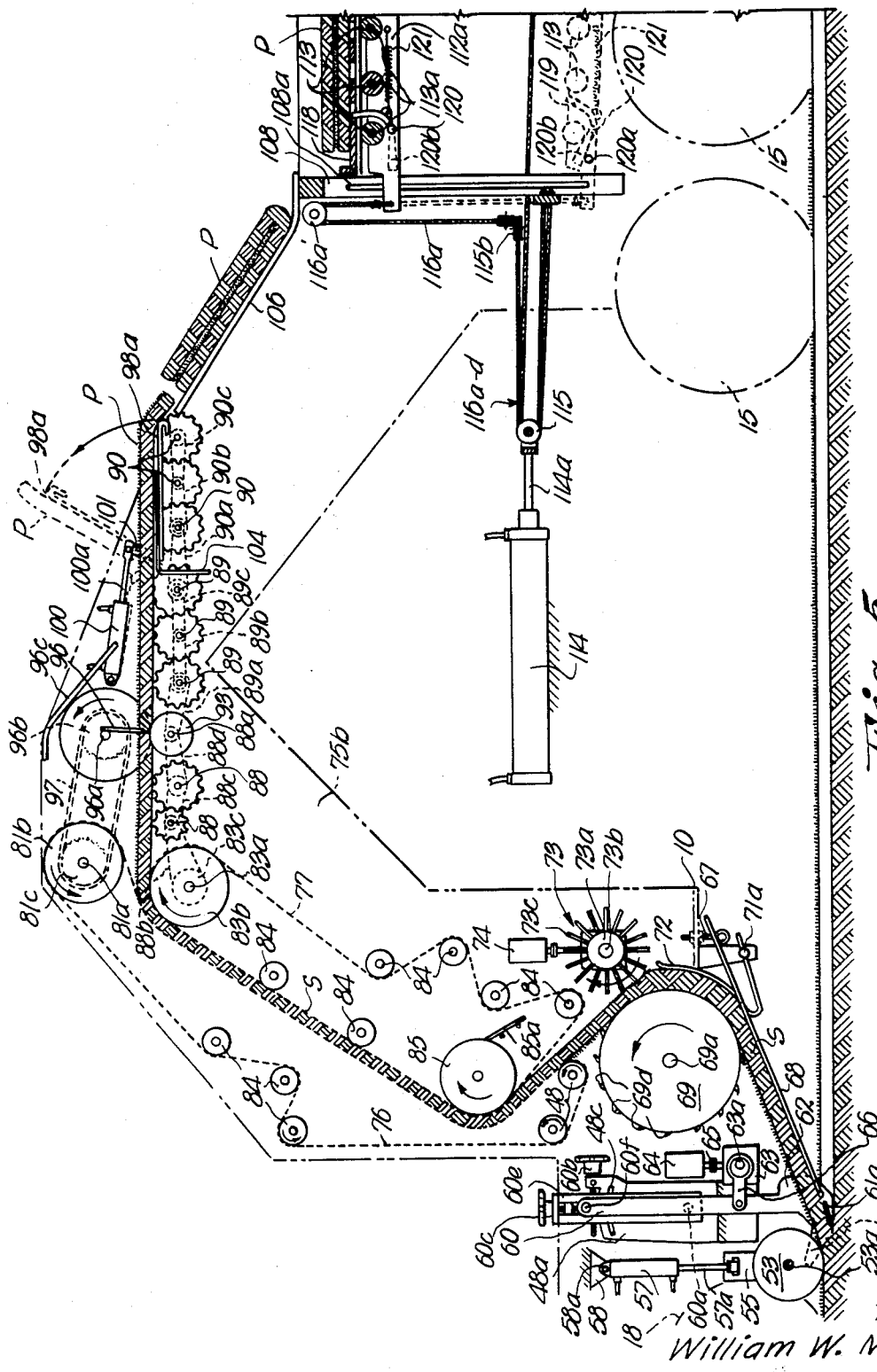
FIG. 5 is a schematic representation of the over-all operation of the harvester showing the sod strips being cut, conveyed, severed, folded in half and palletized.

Turning now more specifically to the tine conveyor mentioned above, a plurality of rods are angled forwardly and downwardly from an I-bolt-lock nut connection 67 with frame 10 (FIG. 5) and terminate in an overlapping relationship with spur guard 62. These rods, hereinafter designated by the numeral 68, contact and support the lower surface for the sod strip as it is cut from the ground by the reciprocating action of the knife portion of cutter head assembly 48. As the sod harvesting apparatus moves through the field, the sod strip S cut by the knives is transferred upwardly on the upper surface of rods 68 until sod strip S comes in contact with rotating tine drum 69. Shaft 69a carries the tine drum as it is mounted for rotation on suitable bearings which are supported from frame 10. The shaft has sprockets 69b and 68c (not shown) on each end portion thereof. Chain 70 interconnects the sprocket on forward gear box 47 (FIG. 1) with sprocket 69b thusly rotating drum 69 in a counterclockwise direction as seen in FIGS. 1 and 5. As the tine drum 69 rotates the associated projecting tines 69d contact the grassy surface of the sod strip and force it rearwardly and upwardly.

Bracket 71 depends from frame 10 and has packing spring 72 connected to the bracket's lower portion by bolt 71a. Packing spring 72 (comprised of a plurality of flexible members) extends forwardly from its rigid connection with bracket 71 and is contoured upwardly and to the rear to approximate the peripheral contour of tine drum 69. An appropriate space between the spring and drum allows the passage of the sod strip S in an upward direction. The packing spring aids significantly in the transfer movement of the sod strip S upwardly and into a proper contacting position with the now to be discussed flail.

A flail 73 is rotatively mounted relative to frame 10 and positioned so that the end extremities of the flail will contact soil excesses on the underside of the soil strip S as it is conveyed by the tine conveyor above the packing spring area. Flail 73 is comprised of a cylinder portion 73a rotatively mounted with shaft 73b. Four rows of rubber fingers, generally indicated by the numeral 73c, are mounted in a spiral manner on cylinder 73a. The distance between the end extremities of the fingers and the surface of the tine conveyor drum 69 may be adjustably selected so that the final uniform thickness of the sod strip is determinable by this adjustable dimension. The flail is rotatively driven by hydraulic motor 74 and may be operated at any desired speed depending upon the soil condition of the underside of sod strip S. It should be noted that steel hammer flails may also be satisfactorily used.

Figure 3:
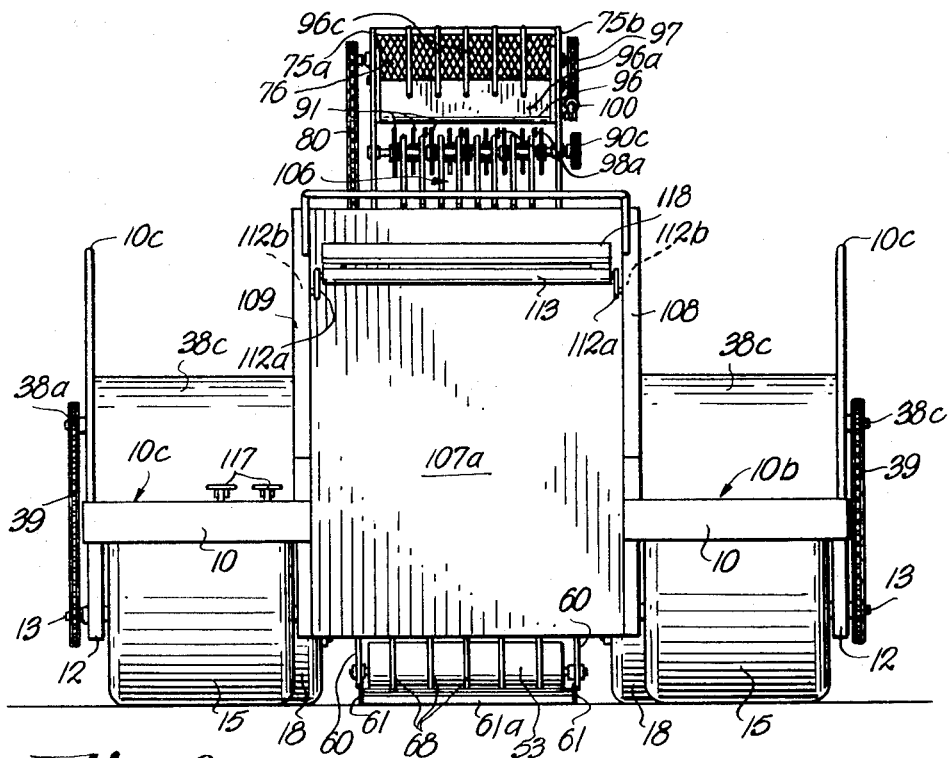
FIG. 3 is a rear elevational view of the harvester shown in FIG. 1.
Figure 4:
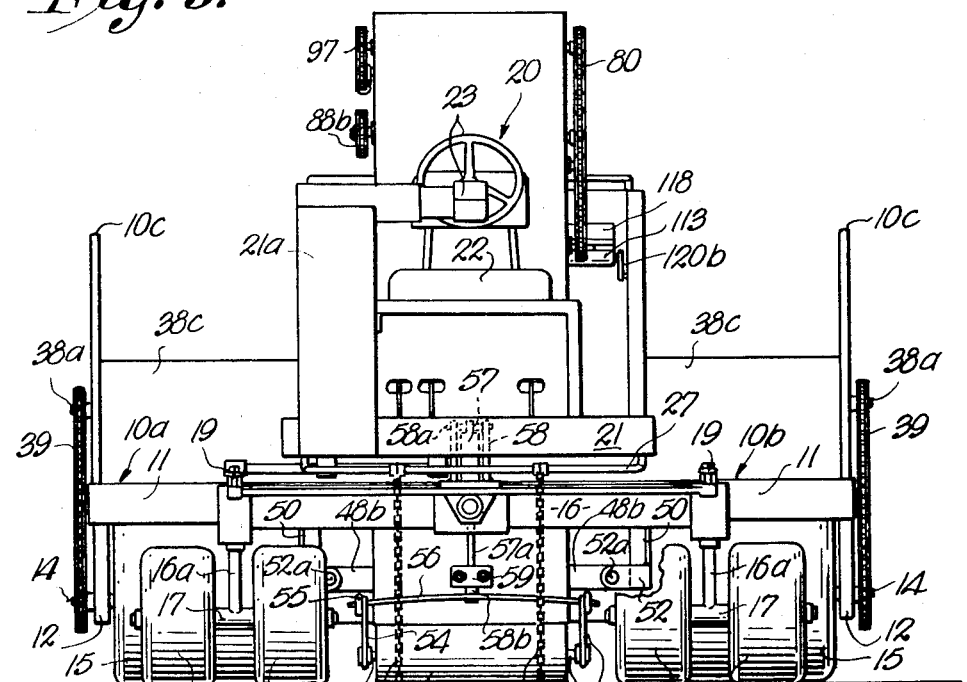
FIG. 4 is a front elevational view of the harvester shown in FIG. 3.

As clearly seen in FIGS. 1, 3 and 4, a portion of the apparatus occupying the upper central area is partially enclosed. This enclosure is accomplished in part by welding opposed steel side plates 75a and 75b to opposite portions of frame 10 immediately behind the operator's cab area 20. These side plates provide mounting surfaces for the conveying, cutting and folding mechanisms which are a part of the over-all operation of the sod harvesting apparatus. These opposed plates (75a and 75b) are selected in height and contour to provide optimum working elevations if workmen are required to be on the apparatus for the stacking operation. Additionally, the opposed mounting plates have the effect of protecting the conveying mechanism's moving parts and channeling the sod while in operation.

As the sod strip, of uniform thickness due to the flailing action of flail 73, is moved upwardly from the tine drum 69 it is fed between a pair of steel mesh conveyor belts 76 and 77. The principal drive for the above-mentioned conveyor belts is taken from sprocket 69c (not shown) located on shaft 69a. Chain 78 (shown in broken lines in FIG. 1) interconnects sprocket 69c with idler sprocket 79a carried on shaft 79 mounted between the opposed upright plates 75a and 75b. Sprocket 79b, not shown, is positioned on the opposite side of shaft 79 and supplies rotary motion to additional conveyor drives. A second chain 80 drivingly interconnects sprocket 79 with sprockets 81, 82 (idler sprockets) and 83, same being located on the outer side of plate 75a. Each of the later mentioned sprockets are rotative with their respective shafts 81a, 82a and 83a, which extend and are mounted on suitable bearings between the opposed upright plates 75a and 75b. shafts 81a and 83a have suitable drums 81b and 83b respectively, mounted thereon for the purpose of frictionally engaging the upper ends of each respective conveyor belt (76 and 77) in order to impart the required rotary motion to same.

A plurality of conveyor forming rollers 84 are selectively spaced along the inner surface of both conveyor belts 76 and 77 to shape and assist in forming the optimum direction of flow and angles of inclination for sod strip S as it is moved upwardly. Each roller 84 is appropriately mounted for rotation between the opposed plates 75a and 75b. A larger drum 85 is rotatively positioned adjacent the inner surface of conveyor belt 77 and is further provided with a scraper 85a. Since conveyor belt 77 is in contact with the soil or underside of the sod strip, drum 85 and scraper 85a cooperate to keep the belts relatively free of caked soil, mud and other foreign particles that might hinder the conveying of the sod strip.

The physical orientation of the two upper drums (81b and 83b) determine the outlet positioning of the inclined conveyor belts 76 and 77 and thusly the horizontal position at which sod strip S will be discharged from the conveyor belt system. As mentioned above, drums 81b and 83b are supported for rotation on their respective shafts (81a and 83a) which are appropriately bearing supported in a horizontal plane between the opposed sides 75a and 75b. Shaft 81a, which rotatably carries drum 81b, extends through the opposed vertically aligned plate 75b and has a second sprocket 81c located thereon, as seen in FIG. 5. Shaft 83a also extends through the bearing connection with the opposed plate 75b an also has a second sprocket 83c lying in substantially the same vertical plane as sprocket 81c. The rotative force supplied from the forward gear box 47 via chains 70, 78 and 80 accordingly drives both shafts 81a and 83a with enough torque to permit further interconnecting rotative mechanisms other than drums 81b and 83b.

A plurality of notched disks forming a horizontal sod conveying means are mounted for rotation on shafts which may conveniently be divided into three separate groupings. For instance, the first two shafts and the next single shaft (not carrying notched disks) from left to right as seen in FIG. 5, are identified by the numeral 88, the next two groups of three shafts are identified as 89 and 90. All of the shafts are mounted between plates 75a and 75b on suitable bearings. The notched disks, hereinafter designated as 91, have their upper surfaces lying in substantially the same horizontal plane. Each shaft, with the exception of shaft 88a, will rotatively carry approximately five or six of such disks with same appropriately staggered (see FIG. 6) to present a substantially complete rotative conveying surface for the sod strips as they exit from the conveyor belt arrangement.

As seen in FIG. 5, the drive for the notched disk shafts is a chain-sprocket arrangement originating from sprocket 83c, same being rotatable with shaft 83a. Each shaft in the three groups of shafts (88, 89 and 90) has two sprockets on its respective end portions that extend outwardly from side plate 75b. These sprockets lie in staggered vertical planes so that each shaft may be chain driven by a preceding shaft and in turn drive a subsequent shaft from fore to aft or left to right as seen in FIG. 5, with the exception of the rearward shaft 90 which does not drive a subsequent shaft. As clearly seen in FIGS. 5 and 6, the following chains interconnect in seriatim from sprocket 83c through to the sprocket on the rearmost shaft 90:

a. Chain 88b —connects sprocket 83c to sprocket on first shaft 88
b. Chain 88c —connects sprocket on first shaft 88 to sprocket on second shaft 88
c. Chain 88d —connects sprocket on second shaft 88 to sprocket on shaft 88a
d. Chain 89a —connects sprocket on shaft 88a to sprocket on first shaft 89
e. Chain 89b —connects sprocket on first shaft 89 to sprocket on second shaft 89
f. Chain 89c —connects sprocket on second shaft 89 to sprocket on third shaft 89
g. Chain 90a —connects sprocket on third shaft 89 to sprocket on first shaft 90
h. Chain 90b —connects sprocket on first shaft 90 to sprocket on second shaft 90
i. Chain 90c —connects sprocket on second shaft 90 to sprocket on third shaft 90

The various sprocket sizes on their respective shafts, 88, 89 and 90, are selectively chosen so that the notched disks on the second shaft 88 will have a 10 percent increase in conveying speed or rotary surface contact speed relative to the disks on the first shaft 88. Shaft 88a supports a rolling mandrel 93 and maintains substantially the same speed as the second shaft 88.

The forward shaft 89 and associated sprocket are driven at a 10 percent speed increase relative to rolling mandrel shaft 88a. Second and third shafts 89 maintain this speed but the first shaft in shaft grouping 90 has its sprocket so selected that a 20 percent speed increase will result from the above-mentioned linkages.

It should be understood that there are essentially three separate sections of horizontal conveying surfaces once sod strip S leaves conveying belts 76 and 77 and that these sections are grouped together by their common shaft numbering referred to above as shafts 88, 89 and 90. The resultant effect of the speed increase within the three distinct sections, from fore to aft, has the effect of aligning and stretching the sod strip as it travels from the belt conveyor along the upper surfaces of the notched disks 91. Also due to the selective spacing of the disks on their respective shafts and the above-mentioned rotation of same, loose soil on the underside of the strip and pads is knocked off and allowed to fall therefrom. Thusly, unwanted stones and clods are eliminated from the processed sod strip.

A cutoff knife 96, mounted on rotary shaft 96a, is chain driven via chain 97 which interconnects sprocket 96b (same being operable to rotate shaft 96a and located on the outwardly extending portion of said shaft from side plate 75b) with sprocket 81c. The cutoff knife 96 with the above-mentioned interconnecting drive, is selected to rotate at a speed that will bring the sharpened cutting periphery of knife 96 in close proximity to the upper surface of rolling mandrel 93 whenever a predetermined footage of soil strip S has passed therebetween. As a result, every time cutoff knife 96 completes one revolution, the sod strip S is severed into sod pads P of any desired length depending on the drive linkages between shaft 81a and shaft 96a. It has been found that a convenient length dimension for sod pad P is 4 feet. This length dimension corresponds to the distance that sod strip S moves on the horizontally conveying notched rotary disks 91 between severings by the rotary cutter 96.

Figure 6:
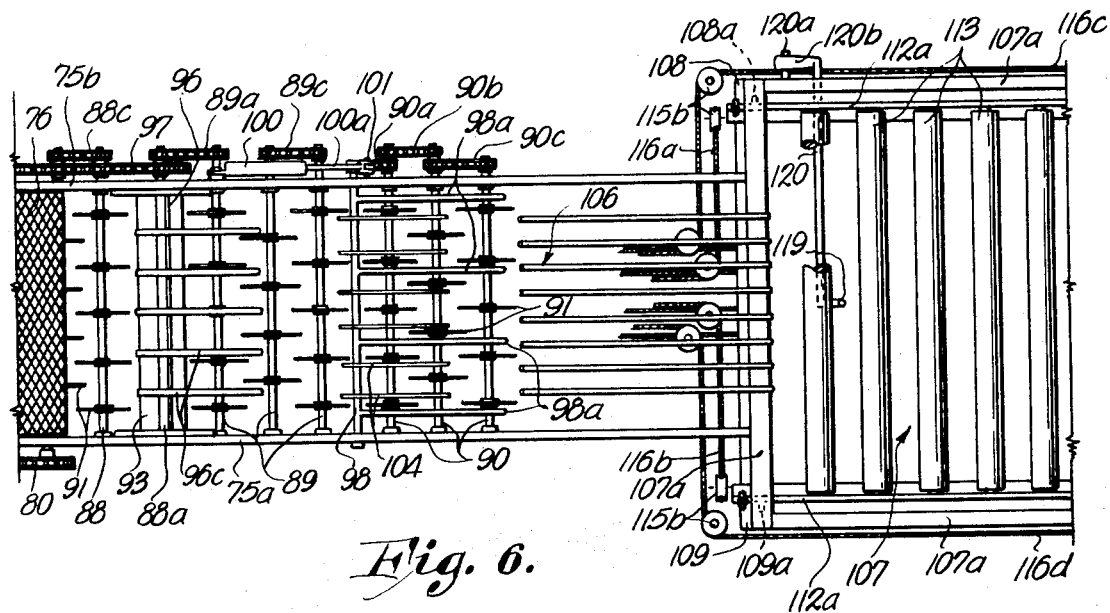
FIG. 6 is an enlarged partial top plan view of the subject harvester showing the rear end portion of the upper conveyor belt, the notched disk conveyors, the folding mechanism, the rotary sod strip severing device, and the roller bed structure.

As seen in FIG. 6, shaft 98 is rotatively mounted between the rear (right) shaft 89 and the forward (left) shaft 90 of the rotary disk conveyors. This shaft provides a rotative or turning moment for a folding mechanism generally indicated by the numeral 99. The folding mechanism 99 includes shaft 98 along with a plurality of rearwardly extending rods 98a weldedly connected thereto and lying in a plane slightly below the upper surface area of the notched disk conveyors carried on shafts 90. A hydraulic cylinder 100 is mounted (by bracket 100b) on side 75b of the opposed side plates and has an associated piston 100a whose end extremity pivotally interconnects with the upper portion of bracket 101 via pin 101a. The lower portion of bracket 101 is fixedly connected with shaft 98 so that any movement of bracket 101 causes a resultant movement of said shaft.

The shaft (98) further includes two cams 102 and 103 which have corresponding switch arm contacts 102a and 103a riding on the peripheral surface therof. As will be explained, when the flexible switch arms 102a and 103a are riding on the detent portion of the cam surfaces, they operate to flex downwardly and complete a normally open electrical circuit schematically indicated by wires W. Further rotation of the camways results in the extant portion of the cam surfaces causing the flexing of the switch contacts upwardly and back to their normally open conditions. Essentially, these cams operate as limit switches to "limit" the position of rods 98a.

Figure 8:
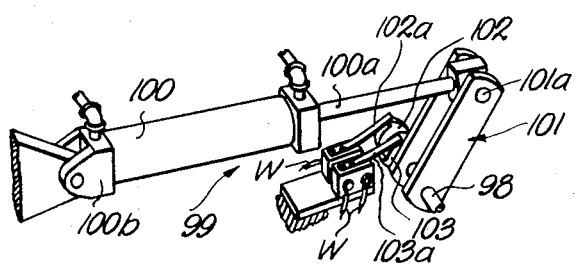
FIG. 8 is a perspective view of the hydraulic cylinder and associated cam switch combination utilized by the folding mechanism.

The hydraulic cylinder 100 is so selected that when piston 100a is retracted, bracket 101 and shaft 98 rotate in a counterclockwise direction (see FIGS. 5 and 8) resulting in the abrupt upward and counterclockwise movement of rods 98a. When a severed sod pad P is in an appropriate position (this position is determined by the timed relationship of the rotation of cutoff knife 96) then the requisite valve (not shown) on the hydraulic cylinder is actuated to retract the piston 100a and flip rods 98a in an upward counterclockwise direction. Actually, rods 98a travel in only about a 60° arc but the sudden and forcible flipping resulting from piston 100a being retracted folds the 4 foot sod pad P in half.

When shaft 98 is rotated counterclockwise (FIG. 8), switch contact 102a will eventually come in contact with and be flexed upwardly by the cam 102 extant. The opening of contact 102a limits the retracting of piston 100a. Switch 103a is allowed to ride in its corresponding cam detent, thereby closing its associated switch contacts to the electrically controlled three way hydraulic valve. With contact 102a open, hydraulic cylinder 100 extends its piston 100a thereby pivoting shaft 98 in a clockwise direction to return the flipper or folding rods 98a to the horizontal position below the upper surface of notched disks 91. When shaft 98 assumes this latter position, the extant of cam 103 flexes switch contact 103a upwardly in an open position and in turn allows switch contact 102a to ride the detent of cam 102, thusly closing same. This combined switching results in electrically preparing the three way electrically controlled hydraulic valve of hydraulic cylinder 100 to be able to retract its cylinder 100a in accordance with the timed relationship of rotary cutter 96. Accordingly, the action is to flip and fold the sod pad at its midpoint into a 2 foot grass-on-grass pad P. A guard having a plurality of inclined rods 96c is connected between opposed side plates 75a and 75b and forms a protective surface on the flipper side of the apparatus so that the flipping and folding of the pad P will not interfere with the rotary mechanisms.

A sod pad guide, comprising a plurality of rods 104 assist in the conveying of the sod pad once it has been folded by the above-mentioned folding mechanism. These rods are bent at a right angle extending vertically from a connection with side plates 75a and 75b and horizontally over shaft 98 from the 90° bend therein. As discussed supra, the 20 percent increase in speed of the notched disks carried by shafts 90 results in a "grabbing" action on the forward extremity of sod pad P and the eventual alignment of pad P as it is conveyed to the rear on the upper surfaces of disks 91.

After sod pad P has been folded and further conveyed toward the rear of the apparatus along the notched disk conveyors, the folded pad reaches an inclined chute area generally designated by the numeral 106. The now folded sod pad (see FIG. 5) will slide down the chute into working position for workmen to lift the folded sod pad from the chute and place it in stacked relationship on a roller bed supported pallet. It is contemplated that automatic means such as pneumatic lifts or rotating chain and hooks be utilized to move the pads from the disk conveyor to the roller bed.

Figure 7:
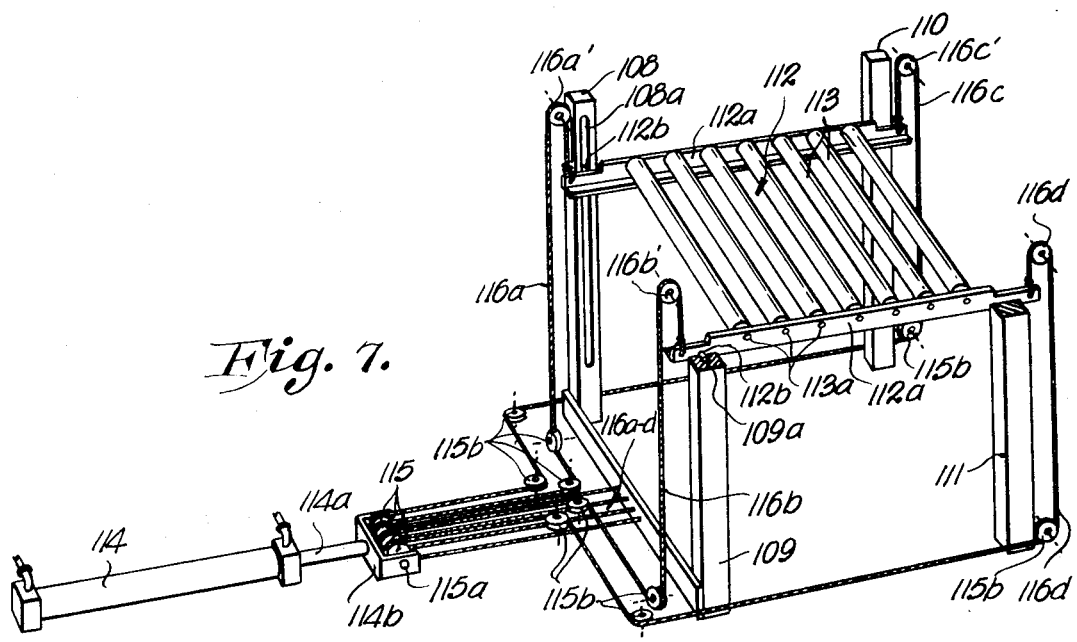
FIG. 7 is a perspective schematic view of the hydraulic lifting and elevation controlling means of the pallet supporting roller bed structure.

The roller bed, hereinafter designated by the numeral 107, is located on the aft portion of frame 10 and has four upright posts which may be either rigidly bolted or welded to frame 10. As schematically shown in FIG. 7, the four posts are arranged to form a rectangle when viewed from above. The forward two posts, 108, and 109, are slotted along their inner faces at 108a and 109a, respectively. Both slots extend from near the upper end portion of their respective posts downwardly to a height of approximately 8 to 10 inches above ground level. The slots provide a keyway type channel for a centering pin of the roller rack described infra. Posts 110 and 111 are not keyed, however they still lend support to the lift means of the roller bed structure and guide the movement of roller rack 112 as it moves up and down.

Roller rack 112 has two angled structurals 112a with the pin guide 112b extending outwardly from each vertical side of the angled structurals at their forward end portions. These pins are positioned within the keyway slots 108a and 109a, respectively (see FIG. 7). A plurality of rollers 113 span the width of the roller rack between the angled members 112a. Rollers 113 may be manufactured from numerous substances including either steel, aluminum or hard rubber and are mounted for rotation on the rods 113a. The rods are fixedly mounted to the vertical portion of angles 112a so that the rollers may rotate on same.

Roller rack 112 is hydraulically moved up and down under the control of hydraulic cylinder 114. Piston 114a may be extended or retracted by the activation of hydraulic cylinder 114, said piston having a bracket 114b on its outer end portion with four pulleys 115 mounted for rotation on shaft 115a that spans the width of bracket 114b (FIG. 7). There are four cables (116a, 116b, 116c and 116d) which cooperate with hydraulic cylinder to facilitate in the vertical movement of the roller rack. Each of these cables is fixedly anchored to the frame or to a fixed point on the forward posts 108 and 109. Each cable extends from its anchored connection and is positioned within its respective pulley 115.

The various cables, 116a–116d, then extend rearwardly from pulleys 115 through spacer pulleys 115b and eventually are positioned over lift pulleys which are individually located near the upper end portions of posts 108, 109, 110 and 11. For example, cable 116a is positioned in pulley 116a' located above the upper portion of slot or keyway 108a. Cable 116b is positioned in pulley 116b' located near the upper portion of slot or keyway 109a, cable 116c is positioned in pulley 116c' located near the upper portion of post 110, and cable 116d is positioned in pulley 116d' located near the upper end portion of post 111. Each cable connects a corresponding end portion of the rectangularly shaped roller rack (see FIG. 7).

When piston 114a is extended, the weight of roller rack 112 (and, of course, any additional weight placed thereon operates to lower the rack in a prescribed plane, determined by the location of guide pins 112b within keyways 108a and 109a, to a position determined either by the lower end extremity of the above-mentioned keyways or by the effective length of the various cables. When piston 114a is retracted, the ends of the cables affixed to each corner portion of roller rack 112 are pulled upwardly over lift pulleys 116a'–116d' so as to raise the entire rack. It is contemplated that foot pedals 117b may be located adjacent the work area on deck 10a and that these foot pedals operate to provide a control over the vertical height of the roller rack.

As suggested above, the frame 10 is extended or increased in upper surface width immediately adjacent the outer sides of posts 109, 111 and 108, 110. This frame designated as 10a and 10b provides for the construction of a work type platform having a rough or scored deck to facilitate the workmen's movements thereon. Each work area is further confined with handrails 10c which extend upwardly from the outer side portions of frame 10a and 10b. To further isolate the movement of the roller rack and to protect the workers as well as to aid in stacking neat pallets, metal sheeting 107a is welded to three sides of the four vertical posts, leaving the rear end open for disposing of a stack of sod pads.

Referring now to FIG. 5, it will be seen that wooden pallets 118 are designed to ride on top of the rollers 113 that comprise the roller rack and facilitate the stacking of sod pads P thereon. Once a rectangular shaped wooden pallet has been placed atop rollers 113, a catch finger 119 will engage one of the slats of the pallet and keep it from sliding off. The catch finger 119 pivots with rod 120 and is spring biased at 121 so that it extends upwardly into engagement with the lower end portion of pallet 118. When it becomes necessary to drop the pallet from the roller rack, piston 114a is extended to allow the rack to drop down to its lowest extremity. A fixed stop rod 120a contacts the underside of a forwardly extending lever arm 120b causing rod 120 to pivot the engaging portion of catch finger 119 out of contact with pallet 118. Since slots 108a and 109a end approximately ten inches from the lower end portion of their respective vertical posts, the rearward end of the roller rack will tilt downwardly relative to the forward end allowing the sod laden pallet to roll downwardly and rearwardly from the roller rack. Once the pallet has been dispensed, then a new pallet may be swung back on the now raised roller rack and the stacking of pads thereon continued in the manner described above.

In summary, the operation of the automatic sod harvester required but three attendant workmen. Engine 29 is turned on, thereby allowing the operator-driver full control over the ambulatory movement of the apparatus, as well as the cutting and conveying operations performed by same. Two stackers (workmen) position themselves on either side of roller bed 107, e.g., one stacker on deck 10a, while the other stacker is on deck 10b.

Due to the fact that the cutter head assembly is substantially centered on the forward end portion of the apparatus and because of the large flotation tires used thereon, the operator may harvest the sod from a sod field by making a series of back and forth "trips" rather than circling the field in decreasing sod harvesting circles. The operator aligns chains 28, which depend from the forwardmost extremity of the apparatus, with a particular boundary on the sod field defining the harvesting area. The cutter head assembly 48 is then placed into resilient contact with the surface of the sod crop by extending hydraulic piston 57a against spring 56. Hydraulic motors 64 and 74 are turned on simultaneously to deliver the reciprocating motion to knives 61–61a and instigate the rotary motion of flail 73.

As the operator now drives the apparatus along the prescribed boundary defined by the presence of either the right or left chain 28, the reciprocating motion of knives 61–61a, which cut the soil directly behind gauge wheel 53, simultaneously severs and lifts the sod strip S interiorly of the apparatus. Since the entire cutter head assembly, including gauge wheel 53, is pivotally mounted relative to the frame 10 of the apparatus, the horizontally oriented blade 61a essentially cuts the strip at a prescribed depth in a plane that is substantially parallel to the surface of the sod field. A gauge wheel 53 will accordingly transversely cant or follow the sod field undulations facilitating the parallel cut. Knives 61 make a vertical cut in the sod immediately adjacent each end extremity of horizontal blade 61a so that strip cutting and lifting may be accomplished regardless of the direction of travel of the apparatus or the area of the sod field previously harvested.

As described supra, the reciprocating motion of knives 61–61a aid in the severing of sod strip S from the sod field as the apparatus moves thereover. When sod strip S is being lifted interiorly of the apparatus, the combination of the inherent stiffness of the sod strip in conjunction with the reciprocating and vibratory effect produced by the reciprocating of the above-mentioned knives, transfer sod strip S upwardly on the upper surface of rod 68. After the strip has traveled only a short distance, the projecting tines 69d of drum 69 are rotatively impaled within strip S. The counterclockwise (see FIG. 5) rotation of drum 69 moves the sod strip upwardly and to the rear. Packing spring 72 resiliently urges the sod strip against the drum and further channels the strip to a position for optimum flailing. By the time the underside of the sod strip approaches flail 73, the strip is substantially supported for the flailing operation by the surface of the upper right hand corner of tine drum 69. The strip is so impaled and supported by projecting tines 69d that when the fingers of flail 73 strike the soil excesses on the underside of strip S, a substantial amount of the flailing force is absorbed through the tine drum in such a manner that the strip will not deviate from its upward moving path. The flailing step produces a sod strip of uniform thickness and this thickness may be adjustably selected to meet whatever requirements are specified by customer demands and soil conditions when the sod strip is relayed.

The tine conveyor transmits the now uniformly thick sod strips into contact with conveyor belts 76 and 77, which further transfer the strip to a horizontal conveying means comprising a plurality of rotating notched disks 91. As sod strip S leaves conveyor belts 76 and 77, the underside of the strip is engaged by a first row of rotating notched disks which assist in the transfer of same to the rear of the apparatus. The notched disks are rotated at selective speeds so as to grab the sod strip, straighten it out and keep it aligned during its rearward travel in the horizontal plane. Also, the disks strike the loose soil and allow it to fall down out of further contact with the strip.

Sod strip S is now aligned and fed between a combination rotary knife 96 and rolling mandrel 93. Each complete rotation of rotary knife 96 severs the sod strip S into sod pads P. The time for making one complete revolution of cutter knife 96 may be selectively varied to produce sod pads of any desired length. Four feet has been found to be a very convenient length for workmen or machines to handle during the relaying of same.

The severed sod strip continues its rearward travel until its rearward half is positioned over flipper rods 98a. A hydraulic cylinder 100 is so timed relative to the severing of the strip that its piston 100a will be abruptly retracted thereby flipping the rearward half of sod pad P upwardly and atop its forward half to form an evenly folded grass-on-grass sod pad.

Further conveyance of the now folded sod pad P is continued to the rear until it is delivered to an inclined chute area 106. As the sod pad comes down the chute 106, the stackers will alternately lift the folded sod pad and place same on a wooden pallet 118 that is supported at the top of rollers 113.

As mentioned above, the height of the roller bed 107 is hydraulically controlled and the stackers may control the height of the rollers by selective manipulation of foot pedals 117. Once an appropriate number of folded sod pads P have been placed on pallet 118, the roller rack 112 is lowered to its lowest extremity and tilted downwardly so that its rear end portion essentially contacts or comes near to the ground level. Rollers 113 then allow the sod laden pallet to be dispensed therefrom onto the ground from the subject apparatus. The roller rack is then hydraulically moved to its upper position, a new pallet placed thereon and the stacking operation continued.

The sod laden pallet, that is now resting on the ground, is of the type that may be engaged and carried by a conventional forklift. Accordingly, a completely mechanized operation would include such a forklift which would immediately pick up the sod laden pallet and transfer same to the back end of a flat bed truck for transporting the optimally sized, neatly stacked pads to their eventual destination and immediate laying.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An ambulatory sod harvesting apparatus comprising a frame
   a wheel supported axle mounted transversely to said frame near the fore and aft portions thereof,
   a cutter head assembly including at least one knife, said assembly supported from said frame and operable to place said knife in contact with the sod for separating a strip of sod from the ground,
   a first means supported from said frame rearwardly of said knife for assisting in the movement a strip of sod cut by said knife rearwardly the direction of travel of said cutter head,
   an intermediate conveying means supported from said frame above said first means for conveying said strip in a substantially upwards direction without breaking up said strip into pieces, said intermediate conveying means having at least one endless belt means moving to accept said sod strip from said first means to convey same in said generally upwards direction,
   a severing means supported from said frame for severing said sod strip into sod pads of uniform preselected lengths, a third conveying means supported from said frame for conveying said sod strip from said intermediate conveying means into operative proximity with said severing means, said third conveying means angularly oriented from said intermediate conveying means to direct said sod strip substantially rearwardly towards said severing means, and an inclined discharge chute supported from said frame and in communicating relationship with said third conveying means enabling said severed pad to slide downwardly thereon to a work station for the loading of said severed pads.

2. The invention as in claim 1 wherein said cutter head assembly includes a means for reciprocating said knife for sod cutting purposes.

3. The invention as in claim 1 wherein said assembly includes a horizontally oriented elongate knife and a vertically oriented knife affixed at each end thereof, said horizontally oriented knife operable to cut the sod strip from the ground at an angle parallel to the plane of the surface of the ground with said vertically oriented knives making a cut at each end thereby facilitating the cutting of the sod into a continuous strip.

4. The invention as in claim 3 wherein said cutter assembly includes a spring biased gauge wheel mounted forwardly of said knife, said gauge wheel having its lower surface contacting the ground under the force of said spring immediately forwardly of said knife and operable to assist in maintaining a uniform cutting depth as said apparatus cuts said sod into a continuous strip.

5. The invention as in claim 1 wherein said first assisting means includes a plurality of inclined rods extending from said frame to a position immediately adjacent the rear of said knife, a tine cylinder rotatably supported from said frame and positioned for tined conveying relative to the top surface of said plurality of rods, a packing spring member supported by said frame adjacent the lower rear surface of said tine cylinder and extending upwardly therefrom, said tine cylinder, said plurality of inclined rods, and said packing spring member cooperating to convey the sod strip from the cutter head assembly into operative relationship with said flail.

6. The invention as in claim 5 wherein said flail is comprised of a plurality of rubber fingers rotatively supported from said frame, said fingers having a selected radial length to facilitate the striking and knocking off of excess soil thicknesses on the under side of said soil strip.

7. The invention as in claim 1 wherein said third conveying means includes a plurality of notched disks mounted for rotation on a plurality of shafts supported from said frame, the longitudinal center line of each shaft lying in the same horizontal plane and transversely oriented relative to the direction of movement of said sod strip.

8. The invention as in claim 7 wherein said notched disks comprise at least three sections of said third conveying means, all of said sections having their upper surfaces in the same plane, and means for successively increasing the rotative speeds of said sections from fore to aft.

9. The invention as in claim 7 wherein said strip is conveyed on the upper surfaces of said notched disks and wherein said severing means includes a combination rotary knife and rolling mandrel in vertical alignment, the end extremity of said knife rotatively positionable in close proximity to the upper surface of said mandrel, said notched disks operable to convey said sod strip between said knife and said mandrel, said rotary knife severing said strip into sod pads with every complete rotation thereof.

10. The invention as in claim 7 including a sod pad folding mechanism located on the aft side of said severing means, said folding mechanism including a rotative shaft supported from said frame and positioned in substantially the same plane as the upper surfaces of said disks, a plurality of rods connected to said shaft and extending to the aft portion of said second conveyor, and means for rotating said shaft to result in an upward flipping motion of said rods in timed relationship with the position of said rotary knife, said rods thereby folding said severed pads in half, said disks operative to continue to convey said folded pads toward the aft portion of said apparatus.

11. The invention as in claim 1 wherein said pad supporting means includes a roller bed capable of carrying a pallet with sod pads stacked thereon, said roller bed supported for vertical movement relative to said frame, means for vertically adjusting the height of said roller bed with respect to said frame and means for tilting the roller bed downwardly from fore to aft when said roller bed is so positioned, said tilting of said roller bed thereby providing a gravity discharge chute for said sod pad carrying pallet.

12. The invention as in claim 11 wherein said roller bed includes a pivotal catch mechanism for locking said pallet on said roller bed, said mechanism having its aft portion extending upwardly through said roller bed and engaging said pallet when said roller bed is raised above said lowest position, the forward portion of said mechanism operable to contact a fixed stop supported from said frame, thereby pivoting said aft portion of said catch mechanism out of contact with said pallet when said roller bed assumes said lowest position.

13. The combination as in claim 1 including a flail, means for rotating said flail, said flail supported from said frame and operable to knock off excess soil thicknesses from the underside of said sod strip prior to said strip being severed into sod pads.

14. The combination as in claim 13 including means for applying pressure on the sides of said strip to provide uniform tension thereupon as said sod strip comes into operative contact with said flail.

15. The combination as in claim 1 wherein said third conveying means includes a plurality of notched discs mounted for rotation on a plurality of shafts supported from said frame, and means for rotating said notched discs in a direction to facilitate the conveying of said sod strips toward said severing means.

16. The combination as in claim 15 wherein said device includes a means supported from said frame and in proximity with said notched discs for folding said sod pads.

* * * * *